United States Patent Office 2,846,451
Patented Aug. 5, 1958

2,846,451

CYCLOPENTANOPHENANTHRENE DERIVATIVES AND PROCESS

Franz Sondheimer, Octavio Mancera, and George Rosenkranz, Mexico City, Mexico, assignors to Syntex S. A., a corporation of Mexico No Drawing. Application December 13, 1954
Serial No. 474,972

Claims priority, application Mexico December 11, 1953

10 Claims. (Cl. 260—397.3)

The present invention relates to a novel cyclopentanophenanthrene derivative and to a novel process for the production thereof.

More particularly, the present invention relates to a novel process for the production of the known androgenic hormone, 17β - methyl - Δ⁴ - androsten-17α-ol-3-one (isomethyl-testosterone) and to novel intermediates for the production thereof.

Although the final product of the present invention, 17β-methyl-Δ⁴-androsten-17α-ol-3-one, has previously been prepared as set forth for example by Miescher and Klarar, Helv. Chim. Acta, 968 (1939), the process there disclosed was not suitable for the efficient production of the compound which has valuable and useful androgenic properties.

In accordance with the present invention a novel process has been discovered for the facile preparation of 17β-methyl-Δ⁴-androsten-17α-ol-3-one starting from the known compound Δ⁵,¹⁷⁽²⁰⁾-pregnadien-3β-ol-21-carboxylic acid and involving the preparation of the novel intermediates 17-methylene-Δ⁵-androsten-3β-ol, 17,20-oxido-17-methyl-Δ⁴-androsten-3-one and 17β-methyl-Δ⁴-androsten-3β,17α-diol.

The novel process of the present invention may be illustrated by the following equation:

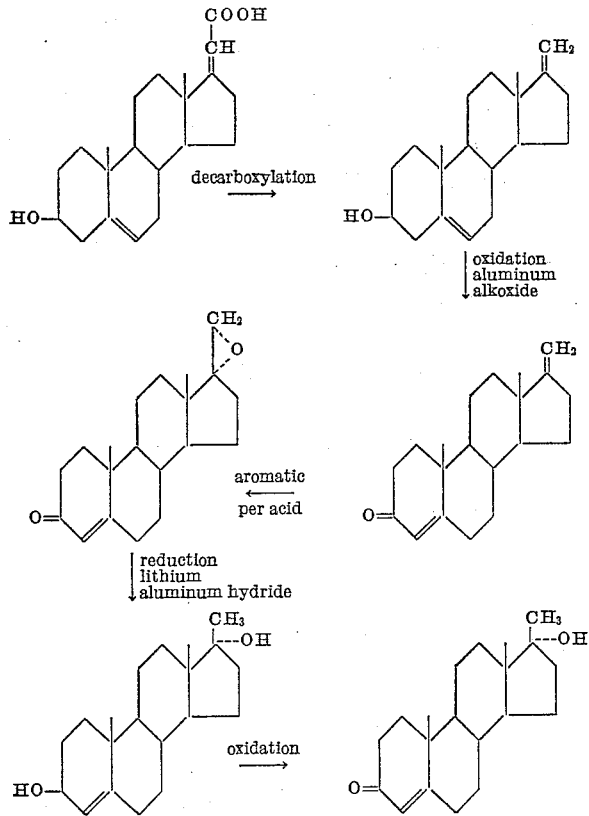

In practicing the process above outlined the known Δ⁵,¹⁷⁽²⁰⁾-pregnadien-3β-ol-21-carboxylic acid (described by Marker et al., J. A. C. S. 64, 1977 (1942)) is decarboxylated by heating in the presence of a high boiling organic amine such as quinoline. Preferably the decarboxylation reaction is catalyzed by a decarboxylation catalyst such as copper chromite. The resultant compound 17-methylene-Δ⁵-androsten-3β-ol is then oxidized with an aluminum alkoxide, such as aluminum isopropylate, in the presence of a hydrogen acceptor, preferably a ketone such as cyclohexanone. The resultant 17-methylene-Δ⁴-androsten-3-one is then treated with an aromatic peracid, such as perbenzoic or perphthalic, to prepare 17,20-oxido-17-methyl-Δ⁴-androsten-3-one. For this last reaction preferably the 17-methylene-Δ⁴-androsten-3-one is dissolved in an inert organic solvent such as chloroform and mixed with the aromatic peracid which is also dissolved in a similar solvent. The reaction solution is then kept in a dark place for a substantial period of time, as for example 16 hours, until all of the peracid is consumed.

The epoxide thus produced after at least partial purification is then dissolved in an organic solvent such as tetrahydrofurane and treated with lithium aluminum hydride in a similar solvent under reflux conditions for a short period of time. After the excess reagent is destroyed the solution is evaporated to dryness to give crude 17β-methyl-Δ⁴-androsten-3β,17α-diol.

The crude 17β-methyl-Δ⁴-androsten-3β,17α-diol is then selectively oxidized preferably with manganese dioxide at room temperature according to the method disclosed in U. S. patent application Serial No. 344,246, filed March 23, 1953, for the oxidation of 3-hydroxy compounds to 3-keto compounds. Other methods for the selective oxidation may also be utilized as for example Oppenauer oxidation (aluminum alkoxide and hydrogen acceptor). The resultant product is the desired iso-methyl-testosterone.

The following specific examples serve to illustrate but are not intended to limit the present invention:

*Example I*

A mixture of 23 g. of Δ⁵,¹⁷⁽²⁰⁾-pregnadien-3β-ol-21-carboxylic acid, 100 cc. of quinoline and 1.25 g. of copper chromite ($CuCr_2O_4$) was refluxed for 4 hours. After cooling, the mixture was poured into water, extracted with ether and the ether extract was washed several times with hydrochloric acid, sodium carbonate solution and water until neutral. The solution was then dried over sodium sulphate and evaporated to dryness, thus giving 18.7 g. of a dark brown solid residue. This residue was chromatographed in a column with 100 g. of activated alumina and the fractions eluted from the column with benzene were combined, evaporated to dryness and crystallized from methanol to give 14.5 g. of 17-methylene-Δ⁵-androsten-3β-ol with M. P. 130–131° C.

10 g. of this methylene compound was dissolved in 400 cc. of toluene and 75 cc. of cyclohexanone, and 50 cc. of the solution was distilled in order to remove traces of moisture. A solution of 6 g. of aluminum isopropylate in 50 cc. of distilled toluene was then added and the mixture was refluxed for 1 hour. The organic solvents were removed by steam distillation and the oily residue was extracted with ethyl acetate. The organic solution was washed with water, dried over sodium sulphate and evaporated to dryness, leaving as a residue a yellow solid. Recrystallization from acetone-pentane yielded 7.8 g. of 17-methylene-Δ⁴-androsten-3-one with M. P. 129–131° C., [α]$_D$+136° (alcohol). The substance showed a selective ultraviolet absorption maximum at λmax. 240 mμ

(log ε 4.27) and the infrared spectrum showed the characteristic bands of the free methylene group.

Example II

A solution of 3 g. of 17-methylene-Δ⁴-androsten-3-one in 20 cc. of chloroform was mixed with 18.8 cc. of a solution of perbenzoic acid in chloroform containing a total of 1.17 g. of perbenzoic acid (0.8 mol). The solution was kept in a dark place, and after 16 hours it was found that all of the perbenzoic acid had been consumed. The solution was washed with water, sodium carbonate solution and water, dried over sodium sulphate and evaporated to dryness. The residue was chromatographed in a column with 40 g. of washed alumina and the fractions eluted from the column with benzene-hexane were evaporated to dryness. Crystallization from acetone-hexane afforded 1.96 g. of the 17,20-epoxide with M. P. 183–185° C., of sufficient purity for the next stage.

1 g. of the epoxide was dissolved in 30 cc. of anhydrous tetrahydrofurane and then added to a solution of 500 mg. of lithium aluminum hydride in 50 cc. of tetrahydrofurane. The mixture was refluxed for 30 minutes, the excess of reagent was destroyed by the cautious addition of small amounts of water and then 20 cc. of a saturated solution of sodium sulphate and 50 g. of solid anhydrous sodium sulphate was added. The inorganic salts were filtered and washed with chloroform and the combined solution was evaporated to dryness. The residue, consisting of the crude 17β-methyl-Δ⁴-androstene-3β,17α-diol, was not purified but it was directly dissolved in 100 cc. of chloroform and mixed with 10 g. of manganese dioxide. The mixture was shaken for 20 hours at room temperature, filtered and the filtrate was evaporated to dryness. The residue was chromatographed in a column with 50 g. of washed alumina and the fractions eluted from the column with benzene-ether were combined. Recrystallization of these fractions from acetone-hexane yielded 0.64 g. of 17β-methyl-Δ⁴-androsten-17α-ol-3-one ("iso-methyl-testosterone") with M. P. 176–178° C., $[α]_D$ +68° (ethanol). The substance showed a selective ultraviolet absorption maximum at λmax. 240 mμ (log. ε 4.30). The infrared spectrum showed bands of free hydroxyl group and unsaturated ketone.

We claim:

1. A process for the production of 17β-methyl-Δ⁴-androsten-17α-ol-3-one which comprises heating Δ⁵,¹⁷⁽²⁰⁾-pregnadien-3β-ol-21-carboxylic acid in the presence of a high boiling amine to decarboxylate and form 17-methylene-Δ⁵-androsten-3β-ol, treating the last mentioned compound with an aluminum alkoxide in the presence of a ketone hydrogen acceptor to form 17-methylene-Δ⁴-androsten-3-one, oxidizing the methylenic double bond of this last mentioned compound with an aromatic peracid to form the corresponding epoxide, reducing the epoxide with lithium aluminum hydride to form 17β-methyl-Δ⁴-androsten-3β,17α-diol and selectively oxidizing the 3-hydroxyl group of the diol with manganese dioxide.

2. A process for the production of 17-methylene-Δ⁵-androsten-3β-ol comprising heating Δ⁵,¹⁷⁽²⁰⁾-pregnadien-3β-ol-21-carboxylic acid in the presence of a high boiling amine.

3. The process of claim 2 wherein the high boiling amine is quinoline.

4. A process for the production of 17-methylene-Δ⁵-androsten-3β-ol comprising heating Δ⁵,¹⁷⁽²⁰⁾-pregnadien-3β-ol-21-carboxylic acid in the presence of a high boiling amine and copper chromite.

5. The process of claim 4 wherein the amine is quinoline.

6. A process for the production of 17-methylene-Δ⁴-androsten-3-one which comprises treating 17-methylene-Δ⁵-androsten-3β-ol with an aluminum alkoxide in the presence of a ketone hydrogen acceptor.

7. The process of claim 6 wherein the alkoxide is the isopropylate and the hydrogen acceptor is cyclohexanone.

8. A process for the production of 17β-methyl-Δ⁴-androsten-17α-ol-3-one which comprises oxidizing the methylenic double bond of 17-methylene-Δ⁴-androsten-3-one with an aromatic peracid to form 17,20-oxido-17-methyl-Δ⁴-androsten-3-one, reducing the oxido compound with lithium aluminum hydride to form 17β-methyl-Δ⁴-androsten-3β,17α-diol and selectively oxidizing the 3-hydroxy group of this last mentioned compound with manganese dioxide.

9. A process for the production of 17β-methyl-Δ⁴-androsten-3β,17α-diol which comprises oxidizing 17-methylene-Δ⁴-androsten-3-one with an aromatic peracid to form a 17,20-epoxide and thereafter reducing the epoxide with lithium aluminum hydride.

10. The process of claim 9 wherein the aromatic peracid is perbenzoic acid.

References Cited in the file of this patent

UNITED STATES PATENTS

| Number | Name | Date |
|---|---|---|
| 2,374,369 | Miescher | Apr. 24, 1945 |
| 2,387,469 | Ruzicka | Oct. 23, 1945 |
| 2,521,586 | Levy | Sept. 5, 1950 |
| 2,577,777 | Levin | Dec. 11, 1951 |
| 2,657,223 | Ruzicka | Oct. 27, 1953 |
| 2,671,084 | Lincoln | Mar. 2, 1954 |
| 2,673,847 | Spero | Mar. 30, 1954 |

OTHER REFERENCES

Helv. Chim. Acta, vol. 22 (1939), pp. 962–69. Copy in Pat. Off. Lib.)